US007070537B2

(12) United States Patent
Polom et al.

(10) Patent No.: US 7,070,537 B2
(45) Date of Patent: Jul. 4, 2006

(54) COMBINATION OF CYLINDER DEACTIVATION WITH FLYWHEEL STARTER GENERATOR

(75) Inventors: Michael E. Polom, Oakland Township, MI (US); Stephen G. Poulos, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 78 days.

(21) Appl. No.: 10/766,155

(22) Filed: Jan. 28, 2004

(65) Prior Publication Data

US 2005/0164828 A1 Jul. 28, 2005

(51) Int. Cl.
*B60K 1/02* (2006.01)
*B60K 6/04* (2006.01)

(52) U.S. Cl. .......................................... 477/3; 903/942

(58) Field of Classification Search .................... 477/3; 123/406.23, 179.28–179.3; 318/432–3; 180/65.2–65.4; 903/941, 942
See application file for complete search history.

(56) References Cited

U.S. PATENT DOCUMENTS 6,040,634 A 3/2000 Larguier
6,098,584 A 8/2000 Ahner et al.
6,202,776 B1 3/2001 Masberg et al.
6,208,036 B1 3/2001 Evans et al.
6,328,671 B1 * 12/2001 Nakajima et al. ............. 477/46
6,487,998 B1 * 12/2002 Masberg et al. ......... 123/192.1
6,554,088 B1 * 4/2003 Severinsky et al. ........ 180/65.2
6,558,290 B1 * 5/2003 Phillips et al. ................. 477/5
6,615,785 B1 * 9/2003 Weiss .................... 123/179.28
6,742,614 B1 * 6/2004 Morimoto et al. ......... 180/65.2
6,886,649 B1 * 5/2005 Wakashiro et al. ........ 180/65.2
2002/0049115 A1 * 4/2002 Suzuki .......................... 477/3
2003/0221883 A1 * 12/2003 Kubodera et al. ......... 180/65.2
2003/0236599 A1 * 12/2003 Saito et al. ................ 180/65.3
2004/0224819 A1 * 11/2004 Bauerle et al. ............. 477/107

* cited by examiner

*Primary Examiner*—Roger Pang
(74) *Attorney, Agent, or Firm*—Christopher DeVries

(57) ABSTRACT

An engine control system and method incorporates an FSG to reduce engine speed variation for a displacement on demand engine. The control system transitions between a normal operating mode wherein all cylinders of the engine are operating and a cylinder deactivation mode wherein cylinders of the engine are deactivated. The FSG adjusts torque output to said crankshaft to reduce engine speed variation in response to an unrequested change in engine speed. This allows expanded use of cylinder deactivation. Cylinder deactivation allows reduced fuel consumption when the engine and the FSG are used in generator mode.

10 Claims, 5 Drawing Sheets

COMBINATION OF CYLINDER DEACTIVATION WITH FLYWHEEL STARTER GENERATOR

FIELD OF THE INVENTION

The present invention relates to engine control systems, and more particularly to an engine control system incorporating cylinder deactivation and a flywheel starter generator.

BACKGROUND OF THE INVENTION

Some internal combustion engines include engine control systems that deactivate cylinders under low load situations. For example, an eight cylinder engine can be operated using four cylinders. When in deactivated mode, the engine is more fuel efficient due to reduced pumping losses. The engine control system deactivates cylinders under light load conditions. For example, light loads occur at steady state cruise when high engine power is not required, and in other situations such as idle and traveling downhill. The engine control system must be able to re-activate the cylinders quickly if the driver or driving conditions require more power than can be delivered in deactivated mode.

A flywheel starter generator (FSG) is connected to a crankshaft of the engine and increases available electrical power during vehicle operation. The FSG replaces a conventional starter, generator and flywheel. Various FSG arrangements are discussed in further detail in commonly owned U.S. Pat. No. 6,208,036 and in U.S. Pat. Nos. 6,202,776 and 6,040,634, which are all incorporated by reference.

The power output by the FSG can be used to reduce fuel consumption and emissions. In addition, the FSG can improve fuel economy by allowing the engine to shut off when the vehicle is temporarily stopped. When the vehicle accelerates from the temporary stop, the FSG restarts the engine.

SUMMARY OF THE INVENTION

A control system and method for a displacement on demand engine includes an engine having a crankshaft. A flywheel starter generator (FSG) communicates with the crankshaft. A controller communicates with the engine and the FSG and initiates cylinder deactivation during engine operation. The FSG adjusts torque output to the crankshaft to reduce engine speed variation during cylinder deactivation.

In other features, the FSG operates at a predetermined speed based on engine speed. The controller adjusts current to the FSG to increase torque when engine sag is detected. The controller adjusts current to the FSG to decrease torque when engine boost is detected.

A control system and method for a vehicle having a displacement on demand engine includes an engine having a crankshaft. A flywheel starter generator (FSG) communicates with the crankshaft. A power converter is associated with the FSG. An engine controller initiates cylinder deactivation during power generation. The FSG operates at a steady state speed and adjusts torque output to the crankshaft to reduce engine speed variation during cylinder deactivation.

In other features, the power converter includes a DC to DC converter that communicates with a high voltage bus. A DC to AC inverter communicates with the DC inverter and an outlet plug.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figures 1, 1A:
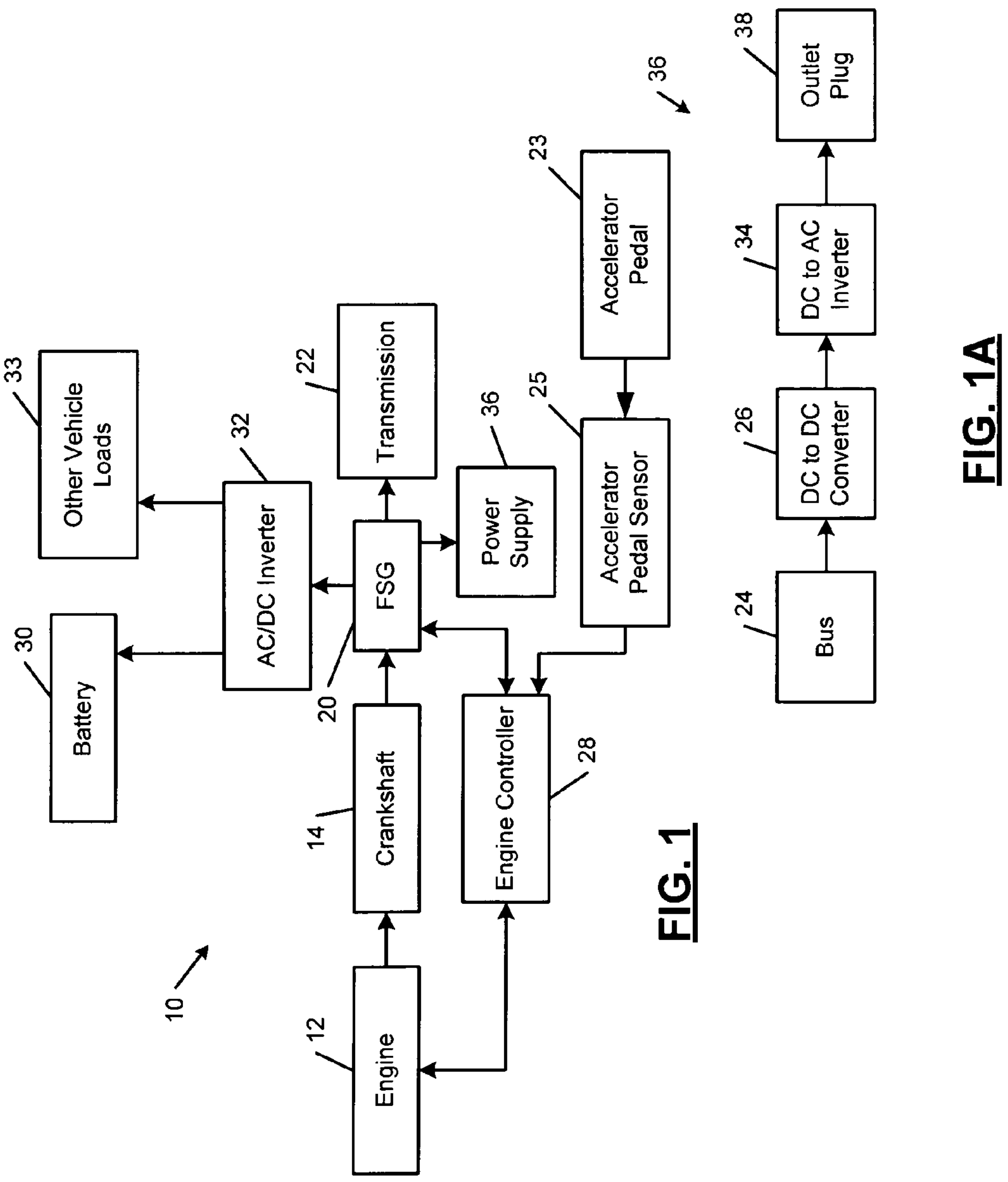
FIG. 1 is a functional block diagram of an engine control system that incorporates cylinder deactivation and a flywheel starter generator according to the present invention.
FIG. 1A is a functional block diagram of an exemplary power supply.

The following description of the preferred embodiment(s) is merely exemplary in nature and is in no way intended to limit the invention, its application, or uses. For purposes of clarity, the same reference numbers will be used in the drawings to identify similar elements. As used herein, activated refers to engine operation using all of the engine cylinders. Deactivated refers to engine operation using less than all of the cylinders of the engine (one or more cylinders not active).

Referring now to FIG. 1, an engine control system 10 for an engine 12 according to the present invention is shown. A crankshaft 14 of the engine 12 rotates an FSG 20 and a transmission 22. A position of an accelerator pedal 23 is sensed by an accelerator pedal sensor 25, which generates a pedal position signal that is output to an engine controller 28. The engine controller 28 communicates with and controls the engine 12 and the FSG 20. The FSG 20 is electrically connected to a battery 30 through an inverter 32. The inverter 32 converts AC current output by the FSG 20 to DC current, which charges the battery 30 and supplies other vehicle electrical loads 33. A power supply 36 is electrically coupled to the FSG 20 and provides one or more output voltages, such as 110V and/or 220V, for powering AC electronic devices such as computers, televisions and other devices.

Referring now to FIG. 1A, the power supply 36 is shown in further detail. A high voltage bus 24 is electrically connected to a DC to DC converter 26, which has an output that is connected to a DC to AC inverter 34. An output of the converter 34 is connected to an outlet plug 38. Passengers of the vehicle can connect AC electrical devices to the outlet plug 38. It will be appreciated that the power supply 36 is merely an exemplary implementation and that other configurations may be employed.

The FSG 20 is used to smooth transitions into and out of cylinder deactivation. The FSG 20 is also used to reduce steady state disturbances while in the cylinder deactivation mode. The controller 28 operates the FSG 20 as a speed control device at a steady state speed over time based on current engine speed. If the engine 12 tries to alter the steady state speed, the FSG 20 outputs a compensating torque onto the crankshaft 14, which reduces engine pulsing and smoothes drive-line torque disturbances. The FSG 20 rotates together with the crankshaft 14. Any unrequested sag (engine torque decrease) or boost (engine torque increase) experienced by the engine 12 in relation to a cylinder deactivation event is compensated with torque generated by the FSG 20.

If control detects an unrequested sag in engine speed, the FSG 20 is operated in a boost mode. In the boost mode, current is output to the FSG 20 to supply torque on the crankshaft 14 in the same direction as the torque of the engine 12. If control detects an unrequested boost in engine speed, the FSG 20 is operated in a braking mode. In the braking mode, current is transmitted to the FSG to apply an opposing torque on the crankshaft 14, which slows the rotation of the crankshaft 14. While reacting to an unrequested engine speed change, the speed of the FSG 20 may increase or decrease speed before returning to a steady state speed. This speed variation of the FSG 20 is minimal.

Figure 2:
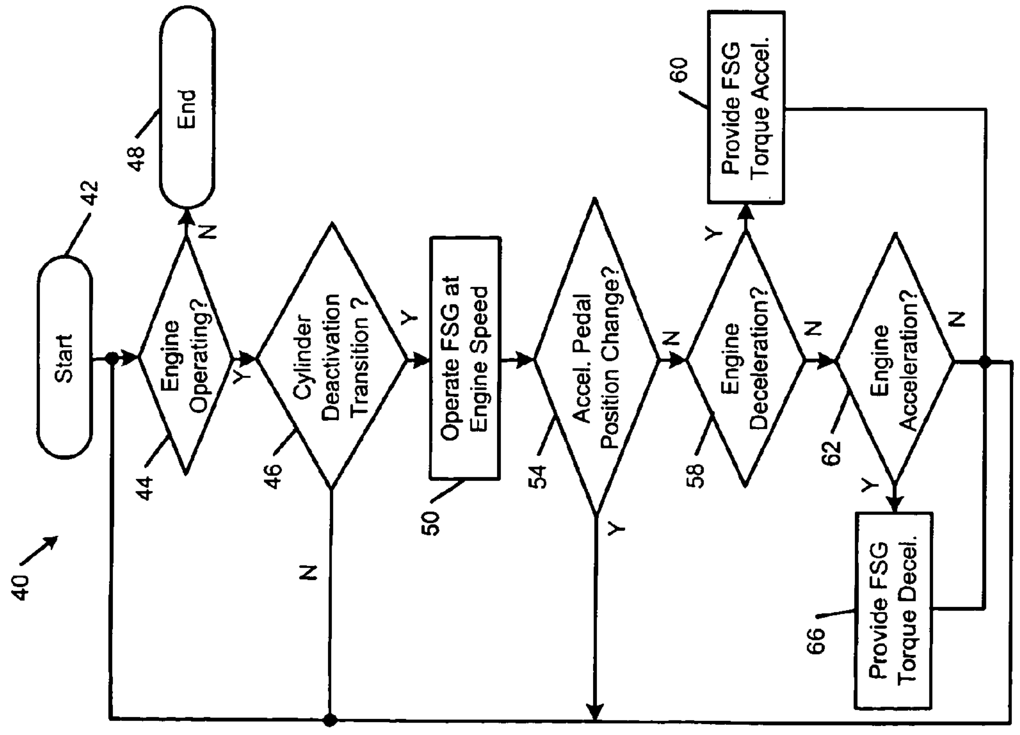
FIG. 2 is a flowchart illustrating steps for reducing torque variation during cylinder deactivation according to the present invention.

With reference to FIG. 2, steps for reducing torque variation 40 using the FSG 20 during cylinder deactivation are illustrated. Torque variation reduction begins with step 42. In step 44, control determines whether the engine 12 is operating. If false, control ends in step 48. If the engine 12 is operating, the controller 28 determines whether a cylinder deactivation transition occurred in step 46. If false, control loops to step 44. If engine operation is transitioning into or out of cylinder deactivation, the FSG 20 is operated at engine speed with the crankshaft 14 in step 50.

In step 54, control determines if an accelerator pedal position has changed. If the accelerator pedal position changed, control loops back to step 44. If the accelerator pedal position does not change, control determines whether engine deceleration occurs in step 58. If false, control proceeds to step 62. If engine deceleration occurs, control applies current to the FSG 20 to increase torque onto the crankshaft 14 in step 60 and control loops to step 44. In step 62, control determines whether engine acceleration is detected. If not, control loops to step 44. If engine acceleration occurs, control applies current to the FSG 20 to decrease torque onto the crankshaft 14 in step 66 and control loops to step 44.

The FSG 20 can also be used during engine idle to smooth engine torque during cylinder deactivation. This capability is used to smooth engine operation and to reduce steady state disturbances during idle while in the cylinder deactivation mode.

Figure 3:
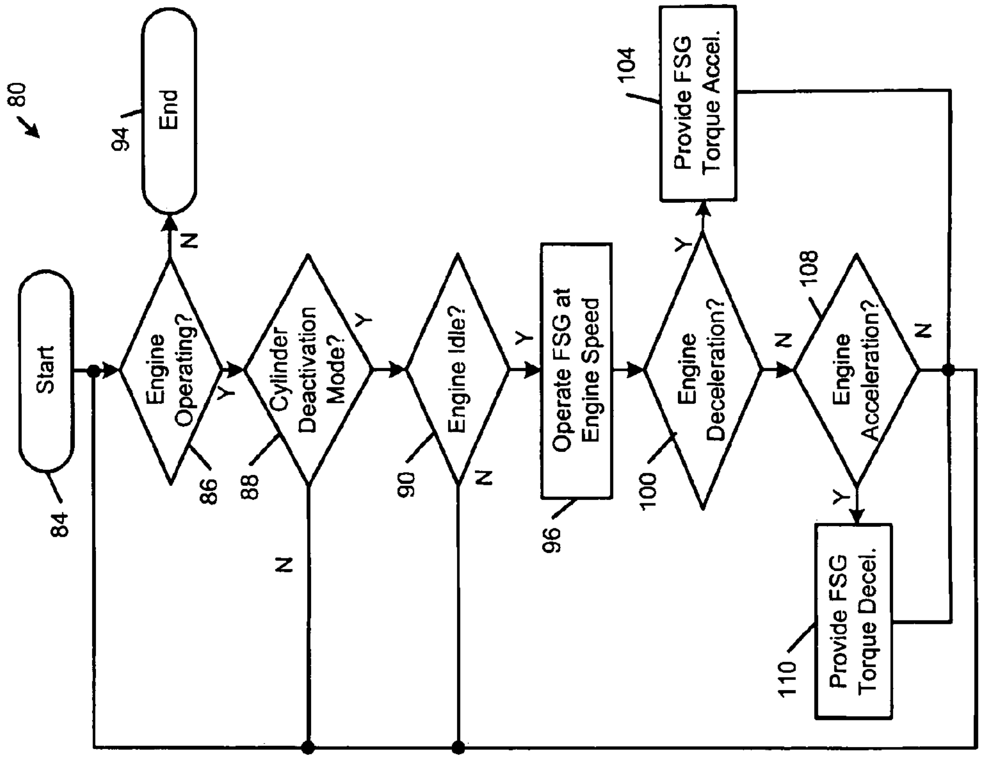
FIG. 3 is a flowchart illustrating steps for reducing torque variation during idle while in cylinder deactivation.

With reference to FIG. 3, steps for reducing torque variation during idle while in deactivated mode using the FSG 20 are illustrated and are generally identified at 80. Idle torque smoothing begins with step 84. In step 86, control determines whether the engine 12 is operating. If false, control ends in step 94. If the engine 12 is operating, control determines whether the engine 12 is in cylinder deactivation mode in step 88. If false, control loops to step 86. If the engine 12 is operating in cylinder deactivation mode, the controller 28 determines whether the engine 12 is operating at idle speed in step 90. If not, control loops to step 86. If the engine 12 is operating at idle, the FSG 20 is operated at engine speed with the crankshaft 14 in step 96.

Control determines whether an unrequested engine deceleration is detected in step 100. If not, control proceeds to step 108. If an unrequested engine deceleration is detected in step 100, control applies current to the FSG 20 to increase torque onto the crankshaft 14 in step 104 and control loops to step 86. In step 108, control determines whether engine acceleration is detected. If not, control loops to step 86. If engine acceleration is detected, control applies current to the FSG 20 to decrease torque onto the crankshaft 14 in step 110 and control loops to step 86.

Figure 4:
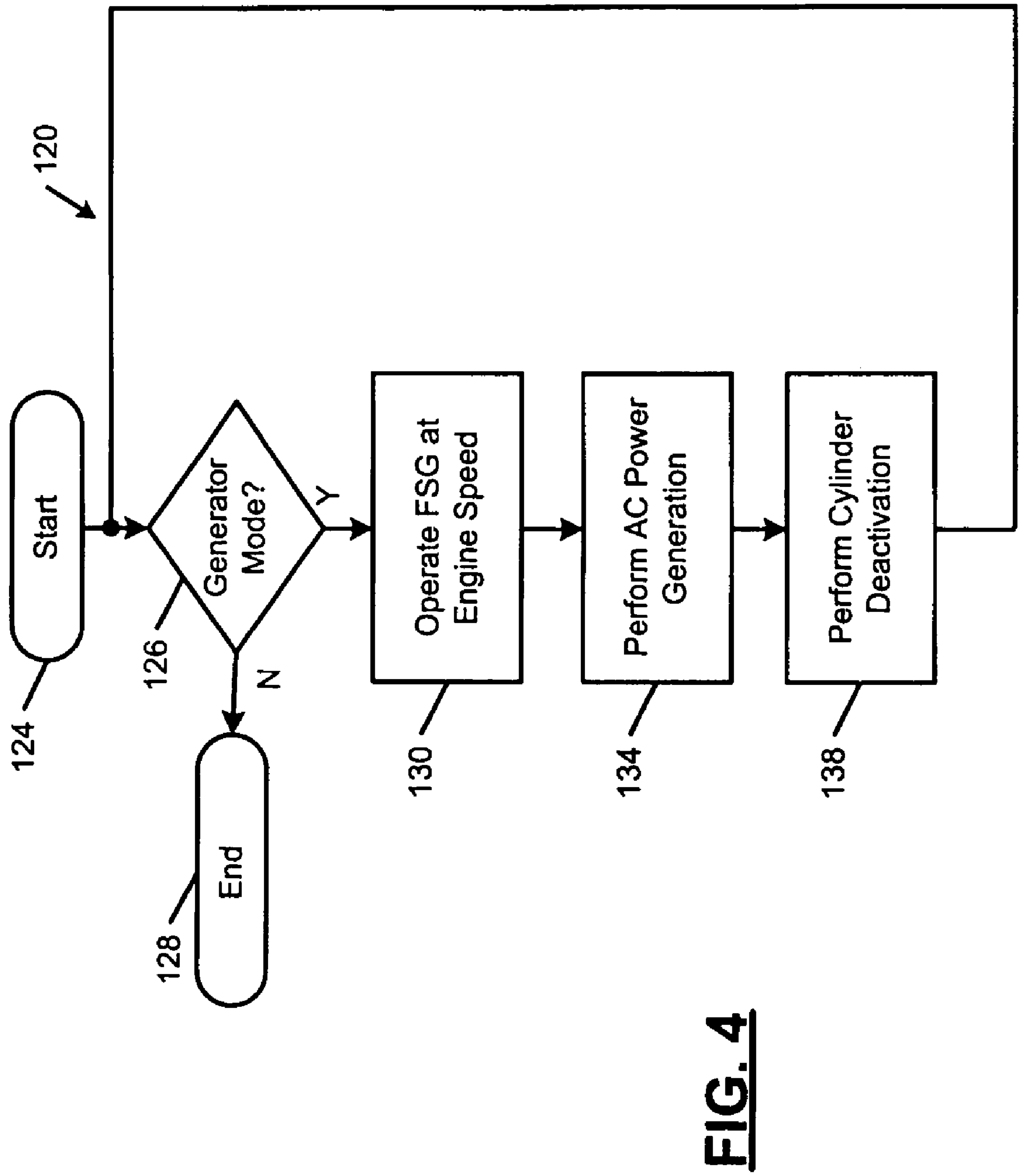
FIG. 4 is a flowchart illustrating steps for improving fuel efficiency with cylinder deactivation while in generator mode.

Cylinder deactivation can be employed when the FSG 20 is used in a stationary generator mode to improve fuel efficiency. Referencing FIG. 4, steps for improving fuel efficiency with cylinder deactivation while in generator mode are illustrated generally at 120. Control begins with step 124. In step 126, the controller 28 determines whether the generator mode is enabled. If not, control ends in step 128. If the generator mode is enabled, the FSG 20 is operated at engine speed in step 130. Skilled artisans will appreciate that a belt driven starter generator may similarly be employed. Control performs AC power generation in step 134 and cylinder deactivation is enabled in step 138.

It will be appreciated that the engine 12 operates at an appropriate speed related to electrical power generation requirements. In this way, the engine 12 operates at idle for minimal electrical power generation requirements and operates at an increased speed for increased power generation.

Figure 5:
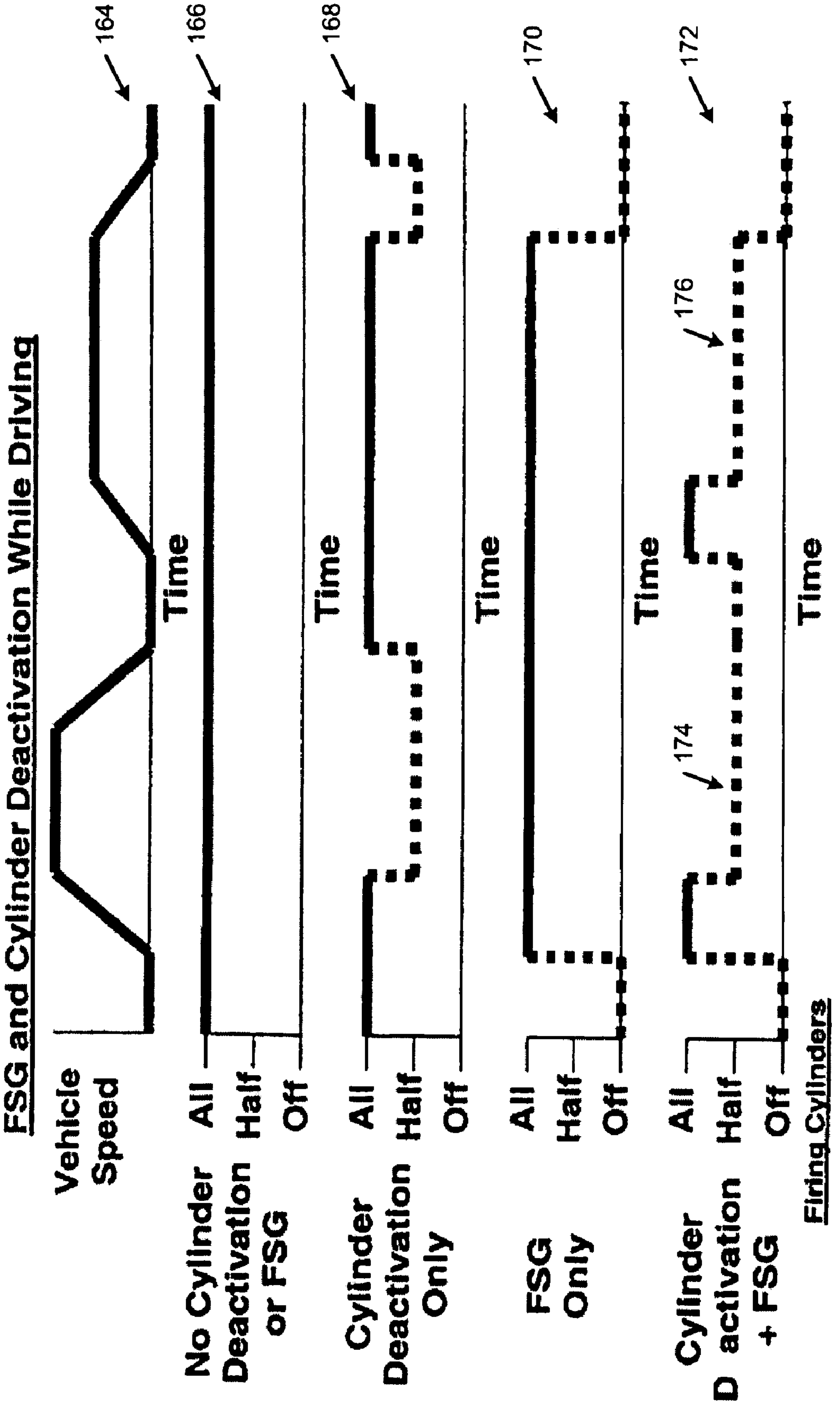
FIG. 5 is a waveform comparison illustrating vehicle speed as a function of time for engines with various cylinder deactivation and FSG engine configurations.

With reference to FIG. 5, several waveforms showing vehicle speed and cylinder modes as a function of time are shown. Exemplary vehicle speed data is shown as a function of time at 164. Cylinder modes without cylinder deactivation or FSG are shown at 166. Cylinder deactivation only is shown at 168. Cylinder modes with the FSG 20 enabled are shown at 170. Cylinder modes with cylinder deactivation and the FSG 20 are shown generally at 172. The FSG 20 enables cylinder deactivation at idle as shown at 174 when engine off at idle is not possible. As a result, the FSG 20 expands the range of operation for cylinder deactivation thereby conserving fuel. In this way, the FSG 20 enables cylinder deactivation over a wider range of driving conditions. When comparing the firing cylinders of trace 172 (both cylinder deactivation and FSG employed) with the firing cylinders of traces 166, 168 and 170, the lowest amount of firing cylinders over time is realized at trace 172. Because the FSG may be employed to provide a torque input, a reduced amount of torque generation is needed by the cylinders. As a result, cylinder deactivation may be entered more often while still providing a necessary overall torque output.

Figure 6:
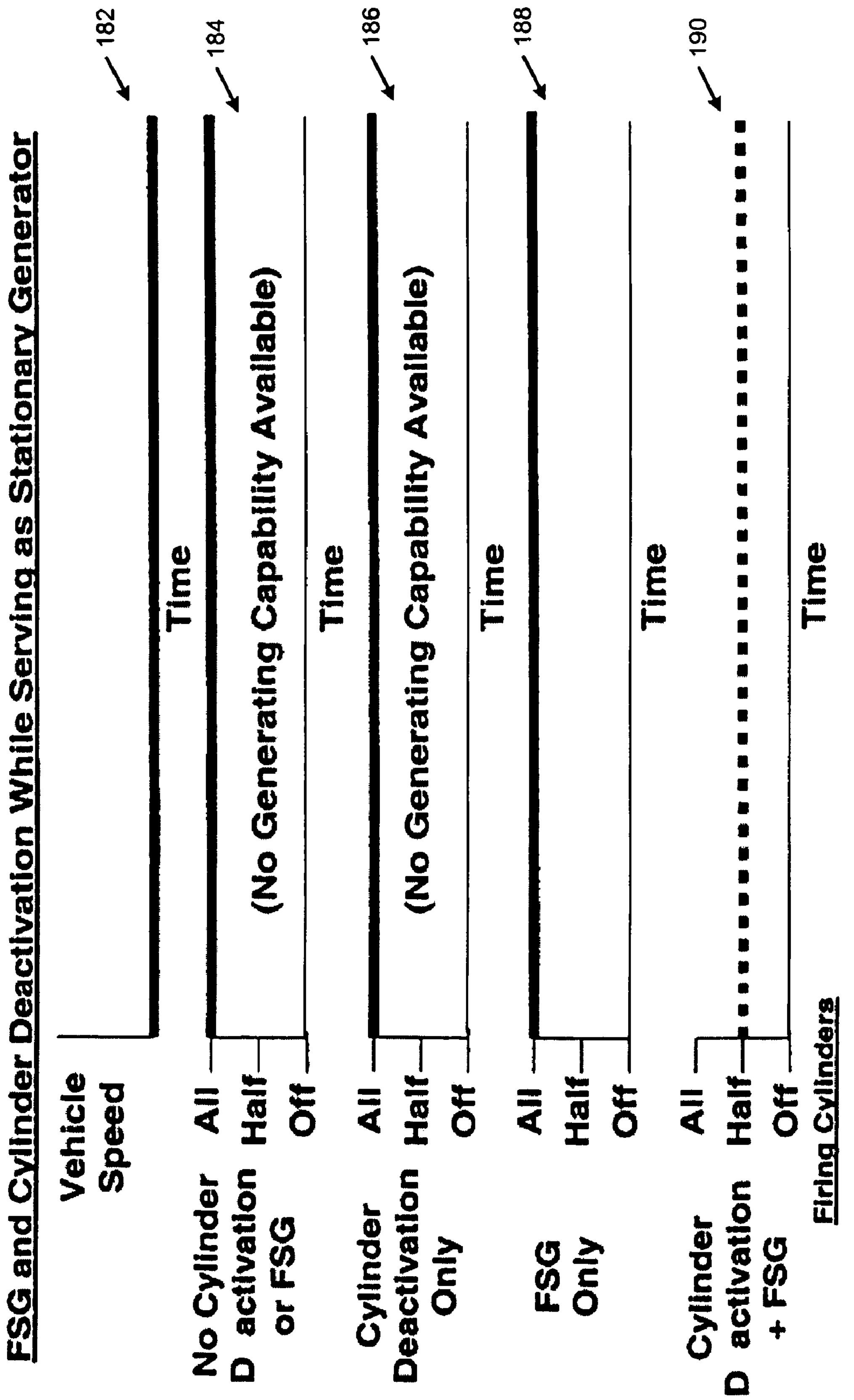
FIG. 6 is a waveform comparison illustrating vehicle speed as a function of time for engines operating as a stationary generator for various cylinder deactivation and FSG engine configurations.

Referring now to FIG. 6, the advantage of incorporating the FSG 20 with cylinder deactivation during the stationary generator mode is illustrated. Vehicle speed data is shown as a function of time. With no cylinder deactivation or FSG used, the activated mode is used at 184. Cylinder modes when cylinder deactivation is employed without the FSG 20 are shown at 186. Cylinder modes of a stationary generator with the FSG 20 and without cylinder deactivation is shown at 188. Cylinder modes with the FSG 20 and cylinder deactivation is shown at 190. As can be appreciated, cylinder deactivation and the FSG lower fuel consumption when operating as a stationary generator.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for a displacement on demand engine comprising:

an engine having a crankshaft;

a pedal position sensor that generates a pedal position signal based on a position of an accelerator pedal;

a flywheel starter generator (FSG) that communicates with said crankshaft; and a controller that communicates with said engine, said pedal position sensor and said FSG and that initiates cylinder deactivation during engine operation, wherein said FSG adjusts torque output to said crankshaft to reduce engine speed variation during cylinder deactivation based on said pedal position signal.

2. The control system of claim 1 wherein said FSG operates at a predetermined speed based on engine speed.

3. The control system of claim 1 wherein said controller adjusts current to said FSG to increase torque when engine sag is detected.

4. The control system of claim 1 wherein said controller adjusts current to said FSG to decrease torque when engine boost is detected.

5. A method for operating a vehicle having an engine with a crankshaft and cylinders and a flywheel starter generator (FSG) that communicates with said crankshaft, comprising:

transitioning between an activated operating mode wherein all of the cylinders are operating and a deactivated operating mode wherein less than all of the cylinders are operating;

determining if an accelerator pedal has changed position; and adjusting torque output to said crankshaft using said FSG to reduce engine speed variation caused by an unrequested change in engine speed in said deactivated mode based on said determination.

6. The method of claim 5 further comprising operating said engine at idle speed.

7. The method of claim 5 further comprising operating said FSG at a steady state speed based on said engine speed.

8. A method for operating a vehicle having an engine with a crankshaft and cylinders and a flywheel starter generator (FSG) that communicates with said crankshaft, comprising:

operating the FSG at engine speed;

operating the engine in one of a first mode wherein all of the cylinders are operating and a second mode wherein less than all of the cylinders are operating;

operating the engine in the other of the first mode and second mode defining a transition;

determining if an accelerator pedal has changed position; and adjusting torque output to said crankshaft using said FSG to reduce engine speed variation caused by an unrequested change in engine speed during said transition wherein adjusting said torque output is based on said determination and includes adjusting current to said FSG.

9. The method of claim 8 wherein the step of adjusting torque includes adjusting current to said FSG to increase torque when engine sag is detected.

10. The method of claim 9 wherein the step of adjusting torque includes adjusting current to said FSG to decrease torque when engine boost is detected.

* * * * *